Patented Jan. 10, 1933                                               1,893,991

UNITED STATES PATENT OFFICE

JOSEF HALLER, OF WIESDORF-ON-THE-RHINE, AND CARL TAUBE, OF LEVERKUSEN-ON-THE-RHINE, GERMANY, ASSIGNORS TO GENERAL ANILINE WORKS, INC., OF NEW YORK, N. Y., A CORPORATION OF DELAWARE

AZO DYESTUFFS ON THE FIBER AND NEW COMPOSITIONS OF MATTER

No Drawing. Application filed March 1, 1929, Serial No. 343,843, and in Germany March 24, 1928.

The present invention relates to the manufacture of azo dyestuffs on the fiber and to new compositions of matter suitable for preparing said dyestuffs.

According to the present invention, the condensation products of diazo compounds containing no sulfonic and carboxylic acid groups with a secondary amine of the formula:

wherein $R_1$ and $R_2$ stand for alkyl, aralkyl or cyclohexyl, or $R_1$ and $R_2$ jointly stand for a pentamethylene chain, for example, dimethylamine, diethylamine, piperidine, cyclohexyl-alkyl-amine, are used for producing azo dyestuffs on the fiber, according to the printing process, especially on the vegetable fiber. The condensation products from the diazo compounds and the secondary amines are obtainable according to the process described by Bayer and Jaeger in Berichte der Deutschen Chemischen Gesellschaft, vol. 8, pages 148 and 893 and by Wallach in Liebigs Annalen der Chemie vol. 235, page 233, by diazotizing in the usual manner an aromatic amino compound with hydrochloric acid and sodium nitrite, and adding slowly the diazo solution to a solution of the secondary amine, advantageously with the addition of a caustic alkali, while stirring, eventually while cooling. The new condensation products separate in a crystalline form, or in form of oils which on cooling solidify. They are generally white to yellowish colored, crystallizing substances with a low melting point, and can be distilled. The condensation products used for the purpose of our invention may be illustrated by the general formula:

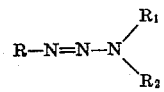

wherein R stands for an aromatic residue containing no sulfonic acid and no carboxylic acid groups, and $R_1$ and $R_2$ stand for alkyl, aralkyl or cyclohexyl, or $R_1$ and $R_2$ jointly stand for a pentamethylene chain.

All these compounds possess the important property of undergoing no decomposition in water or organic solvents, even at 100° C., while they are decomposed quantitatively into their constituents even by cold dilute acids.

According to our invention the above identified condensation products are used for preparing dyes on the fiber according to the printing process. The printing paste used for the purpose of our invention is prepared by mixing together about equimolecular quantities of a diazo-condensation product and a coupling component free from a sulfonic and carboxylic acid group for producing azo dyestuffs, especially a 2.3-hydroxynaphthoic acid arylide, adding to the mixture caustic soda lye in a quantity sufficient for dissolving the coupling component and making up the mixture to a printing paste in the usual manner by adding thereto a thickening agent, such as starch and gum tragacanth and the necessary quantity of water and if desired, Turkey red oil. The fiber is printed in the usual manner with this printing paste, then the fiber is dried, steamed and treated for some time in a bath containing a weak organic acid, and, if desired, Glauber's salt. Generally we carry out the developing process by treating the printed cotton in a bath containing about 5–10% of formic acid or acetic acid and 10% Glauber's salt at elevated temperature, say at temperatures between 50–90° C.

The invention is illustrated by the following examples, without being restricted thereto:

*Example 1.*—11 parts by weight of 5-nitro-2-methoxy-1-benzene-azo-dimethylamine, 15 parts by weight of 2.3-hydroxynaphthoyl-p-anisidine, 10 parts by weight of caustic soda lye of 38° Bé., 30 parts by weight of Turkey red oil, 600 parts by weight of a starch-gum tragacanth thickening agent and 337 parts by weight of water are made into a paste; with this paste cotton is printed in the usual manner, then the cotton is dried for a short time, steamed and introduced into a bath of 80° C. containing in a liter 50 parts by weight of formic acid and 100 parts by weight of Glauber's salt. Then the cotton is rinsed and dried. A powerful bordeau is obtained of excellent fastness properties.

*Example 2.*—14 parts by weight of α-anthraquinone-azo-dimethylamine, 15 parts by weight of 2.3-hydroxy-naphtholy-α-naphthylamine, 30 parts of Turkey red oil and 10 parts by weight of caustic soda lye of 38° Bé. are made up to a paste with a starch-gum tragacanth thickening agent as described in Example 1. The dyestuff is developed in the same manner as described in Example 1. A red is obtained which is fast to a boiling soap-bath.

*Example 3.*—1000 parts by weight of the printing paste contain besides the usual quantity of a starch-gum tragacanth thickening agent and water 19 parts by weight of 3.3' - dimethoxydiphenyl - 4.4'-diazo-piperidide, 26 parts by weight of 2.3-hydroxynaphthoic acid anilide, 20 parts by weight of caustic soda lye of 38° Bé. and 30 parts by weight of Turkey red oil. With this paste cotton is printed in the usual manner and developed as described in Example 1. A blue is obtained.

*Example 4.*—45 parts by weight of 5-nitro-2-methoxy-1-benzene-azo-dimethylamine, 30 parts by weight of di-acetoacetic acid-o-tolidide, 25 parts by weight of caustic soda lye of 38° Bé., 25 parts by weight of Turkey red oil and 75 parts by weight of water are made to a paste. 100 parts of this paste are mixed with 900 parts of starch-gum tragacanth. With the paste thus obtained cotton is printed, and the dyeing is developed as described in Example 1. A deep reddish-yellow is obtained.

If the di-acetoacetic acid-o-tolidide is substituted by β-naphthol, a red is obtained. If a pyrazolone, for example, methylphenylpyrazolone, is used, a yellow is obtained.

We claim:

1. The process which comprises printing fibers with a printing paste containing about equimolecular quantities of a condensation product of the general formula:

wherein R stands for an aromatic residue containing no sulfonic acid and no carboxylic acid groups, and $R_1$ and $R_2$ stand for substituents of the group consisting of the alkyl, cyclohexyl and aralkyl groups, or $R_1$ and $R_2$ jointly stand for a pentamethylene chain, and of a coupling component free from a sulfonic acid and carboxylic acid group for producing azo dyestuffs, drying the fibers, steaming the same, treating them in a bath containing a weak, organic acid, washing and drying the same.

2. The process which comprises printing fibers with a printing paste containing about equimolecular quantities of a condensation product of the general formula:

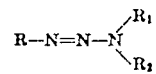

wherein R stands for an aromatic residue containing no sulfonic acid and no carboxylic acid groups, $R_1$ and $R_2$ stand for substituents of the group consisting of the alkyl, cyclohexyl and aralkyl groups, or $R_1$ and $R_2$ jointly stand for a pentamethylene chain, and of a coupling component of the group consisting of the 2.3-hydroxy naphthoic acid arylides, β-napthol, di-acetoacetic acid arylides and pyrazolones, drying the fibers, steaming the same, treating them in a bath containing a weak, organic acid, washing and drying the same.

3. The process which comprises printing fibers with a printing paste containing about equimolecular quantities of a condensation product of the general formula:

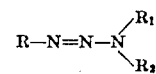

wherein R stands for an aromatic residue containing no sulfonic acid and no carboxylic acid groups, $R_1$ and $R_2$ stand for substituents of the group consisting of the alkyl, cyclohexyl and aralkyl groups, or $R_1$ and $R_2$ jointly stand for a pentamethylene chain, and of a coupling component of the group consisting of the 2.3-hydroxy-naphthoic acid arylides, β-naphthol, di-acetoacetic acid arylides and pyrazolones, drying the fibers, steaming the same, treating them in a bath, containing about 5–10% of an acid of the group consisting of formic acid and acetic acid at a temperature between about 50° C. and 90° C., washing and drying the same.

4. The process which comprises printing fibers with a printing paste containing about equimolecular quantities of a condensation product of the general formula:

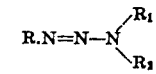

wherein R stands for an aromatic residue containing no sulfonic acid and no carboxylic acid groups, $R_1$ and $R_2$ stand for alkyl groups, and of a 2.3-hydroxynaphthoic acid arylide, drying the fibers, steaming the same, treating them in a bath containing 5% of formic acid and Glauber's salt at a temperature between about 50° C. and 90° C., washing and drying the same.

5. The process which comprises printing cotton with a printing paste consisting of 11 parts by weight of 5-nitro-2-methoxy-1-benzene-azo-dimethylamine, 15 parts by weight of 2.3 - hydroxy - naphthoyl - p-anisidine, 10 parts by weight of caustic soda lye of 38° Bé., 30 parts by weight of Turkey red oil, 600 parts by weight of starch-gum tragacanth thickening agent and 337 parts by weight of water, drying the cotton, steaming the same, and introducing the same into a bath of 80° C. containing 5% of formic acid and 10% of Glauber's salt, rinsing the cotton and drying the same.

6. As new compositions of matter, printing pastes containing about equimolecular quantities of a condensation product of the general formula:

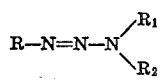

wherein R stands for an aromatic residue containing no sulfonic acid and no carboxylic acid groups, and $R_1$ and $R_2$ stand for substituents of the group consisting of the alkyl, cyclohexyl and aralkyl groups, or $R_1$ and $R_2$ jointly stand for a pentamethylene chain, and of a coupling component free from a sulfonic acid and carboxylic acid group for producing azo dyestuffs.

7. As new compositions of matter, printing pastes containing about equimolecular quantities of a condensation product of the general formula:

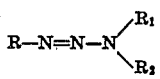

wherein R stands for an aromatic residue containing no sulfonic acid and no carboxylic acid groups, $R_1$ $R_2$ stand for substituents of the group consisting of the alkyl, cyclohexyl and aralkyl groups, or $R_1$ and $R_2$ jointly stand for a pentamethylene chain, and of a coupling component of the group consisting of the 2.3-hydroxynaphthoic acid arylides, β-naphthol, di-acetoacetic acid arylides and pyrazolones.

8. As new compositions of matter, printing pastes containing about equimolecular quantities of a condensation product of the general formula:

wherein R stands for an aromatic residue containing no sulfonic acid and no carboxylic acid groups, $R_1$ and $R_2$ for alkyl groups, and of a 2.3-hydroxynaphthoic acid arylide.

9. As a new composition of matter, a printing paste consisting of 11 parts by weight of 5-nitro-2-methoxy-1-benzene-azo-1-dimethyl-amine, 15 parts by weight of 2.3-hydroxynaphthoyl-p-anisidine, 10 parts by weight of caustic soda lye of 38° Bé., 30 parts by weight of Turkey red oil, 600 parts by weight of starch-gum tragacanth thickening agent and 337 parts by weight of water.

In testimony whereof we have hereunto set our hands.

JOSEF HALLER.
CARL TAUBE.